(No Model.)
M. E. THOMPSON.
ELECTRIC METER.
No. 425,270. Patented Apr. 8, 1890.
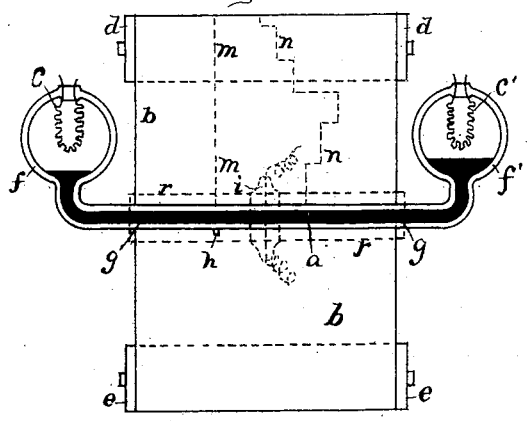
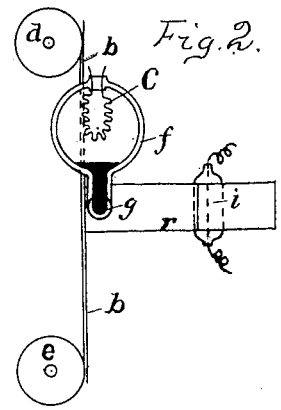
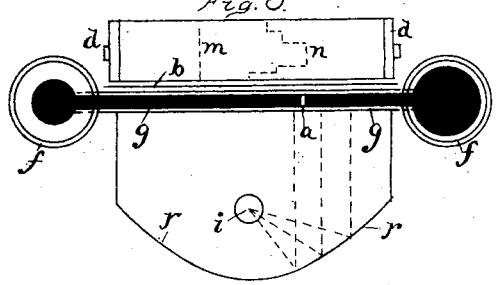
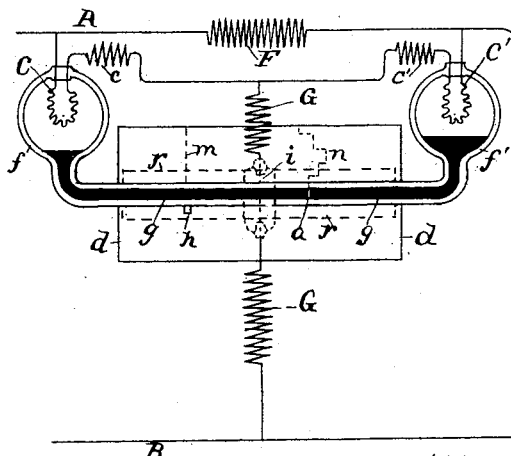
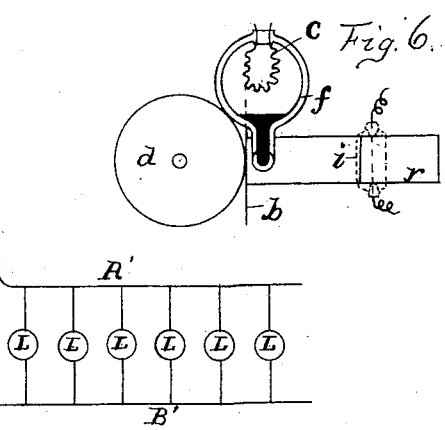
WITNESSES,
INVENTOR.
ATTORNEY.

UNITED STATES PATENT OFFICE.

MILTON E. THOMPSON, OF BOSTON, MASSACHUSETTS.

ELECTRIC METER.

SPECIFICATION forming part of Letters Patent No. 425,270, dated April 8, 1890.

Application filed October 28, 1889. Serial No. 328,385. (No model.)

*To all whom it may concern:*

Be it known that I, MILTON E. THOMPSON, a citizen of the United States of America, residing at Boston, in the county of Suffolk and State of Massachusetts, have invented certain new and useful Improvements in Electric Meters, of which the following is a specification, reference being had therein to the accompanying drawings.

My invention relates to improvements in meters for making a registration of electrical energy, and applies to such as use the heating effect of the current as a means of determining the registration.

It consists, first, of an arrangement of coils, resistances, and wires, whereby a heating effect is produced proportional to the electrical energy to be measured, and, second, of an apparatus for measuring this heating effect, said apparatus consisting of a differential thermometer dependent upon the expansion of a gas or liquid and producing an autographic record.

In the accompanying drawings, Figure 1 is a side view of my apparatus. Fig. 2 is an end view, and Fig. 3 is a plan. Fig. 4 is an enlarged detail of a convenient form of lamp for use in the registering apparatus. Figs. 5 and 6 are side and end views of the same apparatus with a slight difference in the construction of the recording apparatus, producing the record in more compact form. Fig. 5 shows, also, one of the best methods of connecting the meter in the circuit.

Referring to Fig. 5, A A' and B B' are the service-wires leading to the transformer or mains from which the current is supplied, connections with said transformer or mains being made at the ends marked A and B.

C and C' are the heating-coils, which, coupled in series with each other and with the small resistances $c$ and $c'$, form a shunt around the resistance F, placed in the service-wire A A'.

G and G are resistances, which, placed in series with each other and with the lamp $i$, form a shunt across from the middle of the wire connecting coils C and C' to the other service-wire B B'.

L L, &c., are the lamps or other translating devices placed across in multiple arc between the service-wires A A' and B B', and whose consumption of energy is to be measured.

By the above-described arrangement heating effects are obtained in coils C and C', such that the difference of said heating effects is always directly proportional to the energy being consumed in the lamps or other translating devices L L, &c.

I do not here claim the above-described arrangement, as a separate application (Serial No. 313,085, filed June 4, 1889) covering said arrangement has already been allowed to me; and my present invention relates to methods of applying the heating effect obtained by the above-described arrangement to a device for producing an autographic record of said heating effect. Nor do I confine myself to the above method of obtaining said heating effect, my present invention being the method of utilizing such a heating effect to give an autographic record, regardless of any method whereby the heating effect may have been obtained.

In Figs. 1, 2, 5, and 6, C and C' are two heating-coils which receive currents as above described—that is, the difference between the heat developed in the two coils C and C' is always proportional to the energy being consumed.

Referring to Figs. 1, 2, and 3, the heating-coils C and C' are placed either within or around the two bulbs $f$ and $f'$ of a differential thermometer. This consists of two glass bulbs $f$ and $f'$, connected by a narrow tube $g\ g$. The bulbs are filled with air, and the connecting-tube contains mercury or some non-transparent liquid. A small air-bubble $a$ is left in the narrow tube $g\ g$, and so arranged that when the two bulbs are at the same temperature the bubble will be nearer coil C than C'. Close behind this tube is a sheet of sensitized paper, which is wound on rollers $d\ d$ and $e\ e$. These rollers are made to revolve by means of clock-work, thus moving the paper along at a uniform and known rate of speed.

Between the tube $g\ g$ and the paper is placed a covering $b\ b$, which incloses the entire roll of paper and shuts off the light from every portion of it except along the line covered by the tube $g\ g$, so that the only light which can reach the sensitized paper is through the air-bubble $a$. A small hole $h$ is also left in this covering exactly even with the bubble when the two bulbs are at the same temperature. In front of the tube $g\ g$ is arranged a small incandescent lamp $i$, which may form part of one of the resistances used in determining the currents through C and C′. A parabolic reflector reflects the light in parallel rays toward the tube $g\ g$.

The action of the apparatus is as follows: When no current is passing through the consumer's lamps, &c., the heating-coils C and C′ will receive an equal amount of heat, and the air in the bulbs $f$ and $f'$ will be under equal pressures. Consequently the liquid in the tube $g\ g$ will be stationary and the light passing through the bubble $a$ will trace a straight line M M on the sensitized paper. The light passing through $h$ will also always trace a straight line, which in this case will coincide with M M. When the consumer's lamps or other apparatus are in use, the coil C will develop more heat than C′, and the air in bulb $f$ will be under greater pressure than $f'$, and the liquid in the tube $g\ g$ will be forced toward the bulb $f'$, carrying with it the bubble $a$, which will once more come to rest when equilibrium between the two bulbs is reached. The position of the bubble $a$ in the tube $g\ g$ will thus vary with the energy being consumed, and then the light passing through $a$ will trace the line N N, while $h$ will trace the straight line M M, as before. The distance of any point of line N N from M M will then be proportional to the energy being consumed at the moment this point was passing under the bubble $a$, and the area between N N and M M will consequently form an autographic measure of the energy consumed.

If it should be found desirable to get a whole month's record on a comparatively small sheet of paper and still have the record clearly defined without reducing the scale too much, the sheet of sensitized paper may be wound only once around a single drum placed immediately behind the tube $g\ g$, as shown in Figs. 5 and 6. Then by giving to this drum an endwise motion and a rotary motion at the same time we shall get our record in the form of two continuous spirals. When the sheet has been taken from the roll, it can be as clearly and more conveniently read than in the case before described, and will have the advantage of presenting the whole month's record on a single small sheet of paper. Fig. 5 also shows one of the best methods of connecting the meter in the circuit, as before described.

Fig. 4 is an enlarged detail of the lamp $i$, for use in the registering apparatus, $k$ being a single straight carbon filament. The light produced by this lamp is amply sufficient for the purpose intended, and the amount of energy consumed is very small.

The form of register above described has many advantages over any other. The correctness of the registry is dependent upon no mechanical devices, and, the air-thermometer being a very sensitive instrument, the amount of energy consumed in the meter will be practically nothing, while the registry, being independent of mechanical devices, will be accurate from the smallest to the heaviest load. The record left being a clear autograph, showing the exact amount of energy being consumed at any time, it is evident that mistakes will be impossible, since anything of the kind would speak for itself on the record.

I do not confine myself to any special form of construction in the apparatus described, but claim, broadly, the general ideas as set forth, and they may be embodied in such special forms of construction as shall be found in practice to be best suited to the end in view.

Having thus fully described my invention, what I claim as new, and desire to secure by Letters Patent, is—

1. In an electric meter dependent upon the heating effect of the current, the combination, with two heating-coils producing two heating effects whose difference is proportional to the energy to be measured, of a recording differential thermometer for registering the amount of said heating effect, substantially as herein shown and described.

2. In an electric meter using a differential thermometer as an indicating device, the combination, with said differential thermometer, of an air-bubble for separating the liquid in the bulbs and for showing by its movement the difference of heat applied to the two bulbs, substantially as herein shown and described.

3. In an electric meter dependent upon the heating effect of the current, the combination, with a differential thermometer having its two members subject to two heating effects whose difference is proportional to the energy to be measured, of an autographic register for producing a continuous record showing the amount of electrical energy being consumed, substantially as herein shown and described.

4. In an electric meter, the combination, with a number of heating-coils producing two heating effects whose difference is proportional to the energy to be measured, of an autographic register for producing a continuous record showing the difference of said heating effects and consequently the amount of electrical energy being consumed, substantially as shown and described.

5. In an electric meter dependent upon the heating effect of the current, the combination, with two heating-coils producing two heating effects whose difference is proportional to the energy to be measured, of a differential thermometer for showing the difference of said heating effects, and a recording apparatus for recording the indications of said differential thermometer, substantially as shown and described.

6. In an electric meter dependent upon the heating effects of the current, the combination, with two bulbs filled with air or other gas subject to expansion under different heating effects, said bulbs being connected by a narrow tube filled with an opaque liquid, of a small air-bubble separating said column of liquid into two parts and serving by its movement to indicate the difference of expansion of the two bodies of gas contained in the two bulbs, and a recording apparatus for producing a continuous record of the movement of said air-bubble, substantially as herein shown and described.

7. In an electric meter, the combination, with a number of heating-coils producing two heating effects whose difference is proportional to the energy to be measured, of two bulbs filled with air or other gas subject to expansion, said bulbs being connected by a narrow tube filled with an opaque liquid, a small air-bubble separating said column of liquid into two parts and serving by its movement to indicate the difference of expansion of the two bodies of gas contained in the two bulbs, and a recording apparatus for producing a continuous record of the movement of said air-bubble, substantially as herein shown and described.

In testimony whereof I affix my signature in presence of two witnesses.

MILTON E. THOMPSON.

Witnesses:
   GEO. B. DAVIS,
   THAD. S. THOMPSON.